United States Patent
Funato et al.

(10) Patent No.: US 8,049,369 B2
(45) Date of Patent: Nov. 1, 2011

(54) POWER INVERTER CONTROLLER AND METHOD

(75) Inventors: Hiroki Funato, Yokohama (JP); Liang Shao, Ann Arbor, MI (US); Kohji Maki, Novi, MI (US); George Saikalis, West Bloomfield, MI (US)

(73) Assignee: Hitachi, Ltd., Tokyo (JP)

( * ) Notice: Subject to any disclaimer, the term of this patent is extended or adjusted under 35 U.S.C. 154(b) by 457 days.

(21) Appl. No.: 12/409,002

(22) Filed: Mar. 23, 2009

(65) Prior Publication Data

US 2010/0237693 A1    Sep. 23, 2010

(51) Int. Cl.
H02J 3/32 (2006.01)
H02J 5/00 (2006.01)
(52) U.S. Cl. .......................................... 307/90; 307/91
(58) Field of Classification Search ............. 307/90, 307/91
See application file for complete search history.

(56) References Cited

U.S. PATENT DOCUMENTS

| | | | | |
|---|---|---|---|---|
| 6,624,536 B1* | 9/2003 | Sawada et al. | ................ | 307/91 |
| 7,339,287 B2* | 3/2008 | Jepsen et al. | .................... | 307/82 |
| 7,834,480 B2* | 11/2010 | Mandalakas et al. | ........... | 307/46 |
| 2008/0315685 A1* | 12/2008 | Mandalakas et al. | ........... | 307/46 |

* cited by examiner

*Primary Examiner* — Bao Q Vu
(74) *Attorney, Agent, or Firm* — Gifford, Krass, Sprinkle, Anderson & Citkowski, P.C.

(57) ABSTRACT

A controller for a power inverter having a gate assembly with an alternating current power output. A gate driver controls the activation of the gate assembly while a processor controls the operation of the gate driver. A current sensor has an output signal representative of the current at the power output. A noise detector circuit provides an output signal to the processor of the frequency of electromagnetic noise in the power inverter and the processor is programmed to sample the current from the current sensor at the frequency of the noise.

12 Claims, 2 Drawing Sheets

023# POWER INVERTER CONTROLLER AND METHOD

BACKGROUND OF THE INVENTION

I. Field of the Invention

The present invention relates generally to power inverters of the type used in hybrid electric vehicles, electric vehicles, and fuel cell vehicles, and more particularly, to such a power inverter with noise compensation.

II. Description of Related Art

In view of the high cost of hydrocarbon fuel, hybrid electric vehicles, electric vehicles, and fuel cell vehicles have enjoyed increased popularity. In such vehicles, one or more electric motors are utilized to assist the engine to provide more traction power as well as to regenerate power to charge the battery. For both driving the vehicle as well as regenerating the battery, a power inverter is required to complete the power conversion between alternating current used to power the motor and generated by the motor during a braking cycle, and direct current. The direct current is used to store power in the battery during a regeneration period of operation of the vehicle while DC power from the battery is used to power the motor for increased traction and/or acceleration.

For a fall hybrid system, the electric motor typically has a power capacity of at least 50 horsepower in order to power the vehicle independently without the gasoline engine. This high power rating for the electric motor results in high voltages and high current requirements for the hybrid electric vehicle.

In order to obtain proper operation of the hybrid electric vehicle, current sensing is an important function for the electrical drive system of the vehicle. The typical HEV system utilizes electric motors to assist the traction torque when acceleration is required as well as to regenerate power during braking. Previously, the hybrid controller regulates the driving current of the electric motor and thus controls the output torque for the electric motor system. Consequently, current sensing results are very important to accurately control the performance of the hybrid vehicle. Such performance factors include power transition, smoothness, acceleration quality, braking performance and the like. Conversely, rough or inaccurate current sensing quality may affect the driving quality, the overall performance of the electric vehicle and, in extreme cases, even cause system failure.

Accurate current sensing for the power inverter in an REV, however, is oftentimes difficult to obtain due to the number of electromagnetic noise (EMI) sources within the power inverter. For example, a typical power inverter utilizes high battery voltage which is electrically connected to the HEV motor through insulated gate bipolar transistors which operate under the control of a gate driver. The gate driver selectively switches the transistors in the gate assembly to produce three phase alternating current electrical output for the HEV motor. The switching of the high current and high voltage within the power inverter also creates excessive noise.

Typically, the power inverter for an HEV uses pulse width modulation (PWM to regulate the phase currents and thus the torque of the REV motor. The switching frequency for the gate assembly transistors is typically in the range of 1 kilohertz to 20 kilohertz and this noise typically enters the AC output to the motor.

Although the switching of the gate transformers in the gate assembly for the inverter constitutes a major source of EMI in the inverter, there are other sources of EMI in the inverter which also enter the current output to the motor. For example, many HEV power inverters include different DC voltages so that DC-DC converters, oftentimes using PWM switching power supplies, also add to the EMI within the inverter These other sources of EMI, furthermore, oftentimes operate at different frequencies than the gate assembly for the power inverter.

Since EMI is present on the current sensor output, the current sensor for the previously known power inverters provides an inaccurate signal to the controller for the power inverter. Since the controller controls the activation of the gate assembly, and thus the current to the HEV motor, less than optimal operation of the electric motor results.

SUMMARY OF THE PRESENT INVENTION

The present invention provides a power inverter which overcomes the above-mentioned disadvantages of the previously known power inverters.

In brief, the power inverter of the present invention, like the previously known power inverters, includes a gate assembly having an alternating current power output. Typically, the gate assembly comprises a plurality of insulated gate bipolar transistors, although other types of gate assembly may also be used.

A processor controls the operation of a gate driver which, in turn, controls the activation of the gate assembly. Consequently, the processor, by controlling the activation of the gate assembly, controls the current and phase of the electrical power provided to the HEV, EV, or fuel cell vehicle motor.

A current sensor has an output signal representative of the instantaneous current of the power output. For a three-phase system, three different current sensors may be used.

Unlike the previously known power inverters, the power inverter of the present invention includes a noise sensing circuit which provides an output signal to the processor of the frequency of the electromagnetic noise in the power inverter. If there are multiple sources of noise at different frequencies, the noise sensing circuit selects the dominant noise source, i.e. the noise source producing the greatest amount of EMI, and determines the frequency of that noise source.

The processor is then programmed to sample the current from the current source at the frequency of the dominant noise. By sampling the current at the frequency of the dominant noise, fluctuations in the current signal at the power output from the gate assembly are eliminated or at least minimized. By eliminating noise induced fluctuations in the current reading, the processor provides smoother current control to the gate assembly thus providing optimal operation of the electric motor.

In order to eliminate or at least reduce any DC offset that may be caused during the current sampling, current sampling for one full cycle of the output current from the inverter is summed together over one complete cycle. At the completion of that cycle, the magnitude of the sum, either positive or negative, constitutes the DC power offset. That power offset is then utilized by the processor to achieve the desired current output for the next cycle of the output current.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
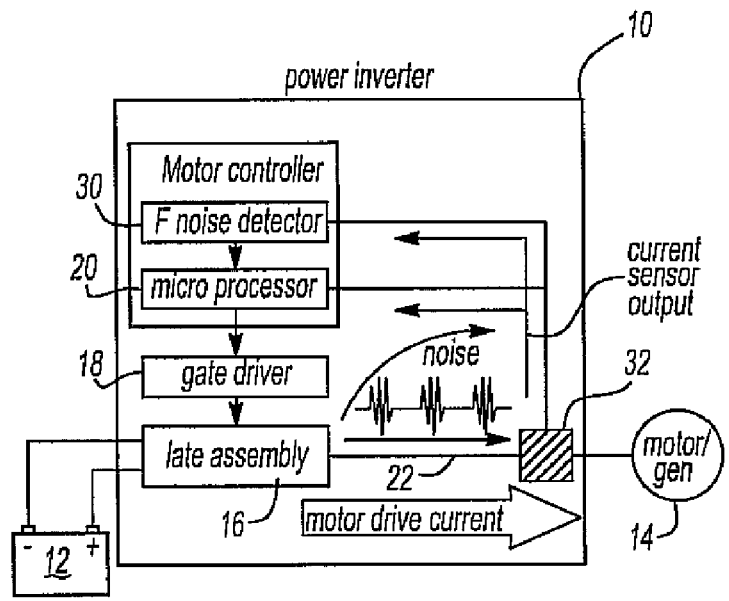
FIG. 1 is a block diagrammatic view illustrating a preferred embodiment of the present invention.

With reference first to FIG. 1, a block diagrammatic view of a power inverter 10 according to the present invention is illustrated. The power inverter 10 is of the type used on hybrid electric vehicles (HEV). In HEVs, the power inverter selectively controls the current flow between a DC battery 12 and an alternating current motor/generator 14 through a gate assembly 16. During periods of acceleration, power is drawn from the battery 12 and provided to the motor/generator 14. Conversely, during periods of braking or other deceleration, the motor/generator 14 recharges the battery 12 through the power inverter 10.

Still referring to FIG. 1, the gate assembly 16 may take any conventional form, but preferably includes a plurality of insulated gate bipolar transistors. A gate driver 18 controls the activation of the gate assembly under control of a processor 20 to convert the DC current from the battery 12 to alternating current for the motor/generator 14, or vice versa. Consequently, the gate assembly 16 provides its electrical output current on its output 22. The processor 20, furthermore, preferably utilizes pulse width modulation (WPM to control the amount of current provided on the power output 22 from the inverter 10.

In view of the high current and high voltage switch by the gate assembly 16, the gate assembly 16 forms a major source of electromagnetic interference (EMI) or noise within the inverter 10. This EMI, furthermore, enters the current output on the output 22 from the power inverter 10.

Figure 2:
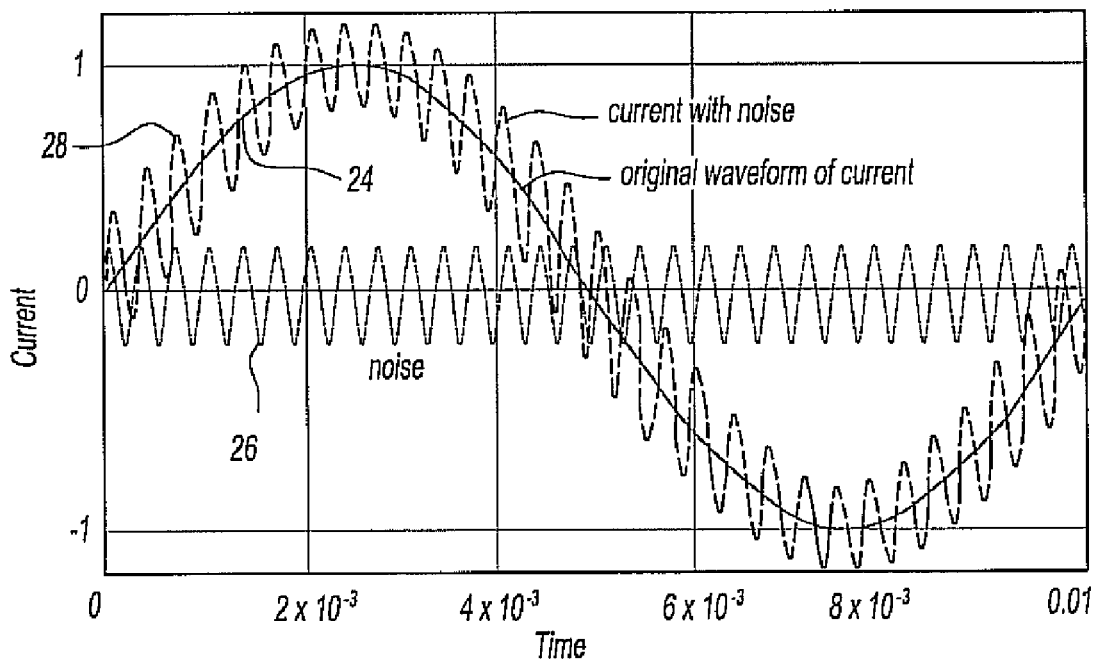
FIG. 2 is a view illustrating the current signal on the output from the inverter.

For example, with reference to FIG. 2, one cycle of a current output signal on the inverter output 22 is illustrated at 24. A high frequency noise signal 26 is also present within the inverter 10. This high frequency noise signal 26 typically has a steady frequency and a steady amplitude. That high frequency noise, furthermore, is summed with the current output signal 24 from the power inverter 10 to form a composite current plus noise signal 28 from the power inverter 10.

Even though the gate assembly forms a major source of EMI in the power inverter, there are other sources of noise in the power inverter, such as DC to DC power converters. These other noise signals vary in frequency, as well as amplitude. However, for the operation of the present invention, the dominant or largest noise signal is selected as the noise signal 26.

With reference now to FIGS. 1 and 2, in order to compensate for the composite current signal 28 on the output 22 to the motor 14, the power inverter includes a noise detector 30 (FIG. 1) which receives an input signal from a current sensor 32 which detects the instantaneous current on the output 22 from the inverter 10. That noise detector 30, preferably through the use of fast Fourier transform hardware, determines the frequency of the dominant noise 28 and provides that frequency signal as an input signal to the inverter processor 20. The processor 20 is then programmed to sample the current signal from the current sensor 32 at the same frequency of the dominant noise as determined by the noise detector 30.

Since the noise 26 is at a constant frequency, the composite noise and current signal 28, when sampled at the frequency of the noise, will produce a relatively smooth current signal without the perturbations resulting from the addition of the noise signal 26 to the current signal 24. This relatively smooth signal results since the composite signal 28 is sampled at the same angular offset of the noise signal 26 for each current sample.

Even though the sampling of the current on the output 22 from the inverter at the frequency of the dominant noise will produce a smooth current signal approximating the original current signal 24, there may be a DC offset from the actual current signal 24 and the sampled current signal 24. For example, if the composite signal 28 is sampled at the peak of the noise 26, a positive DC error will result between the actual current signal 24 and the sampled signal. Similarly, the converse would be true for a signal sampled at or near the bottom of each cycle of the noise signal 26.

Figure 3:
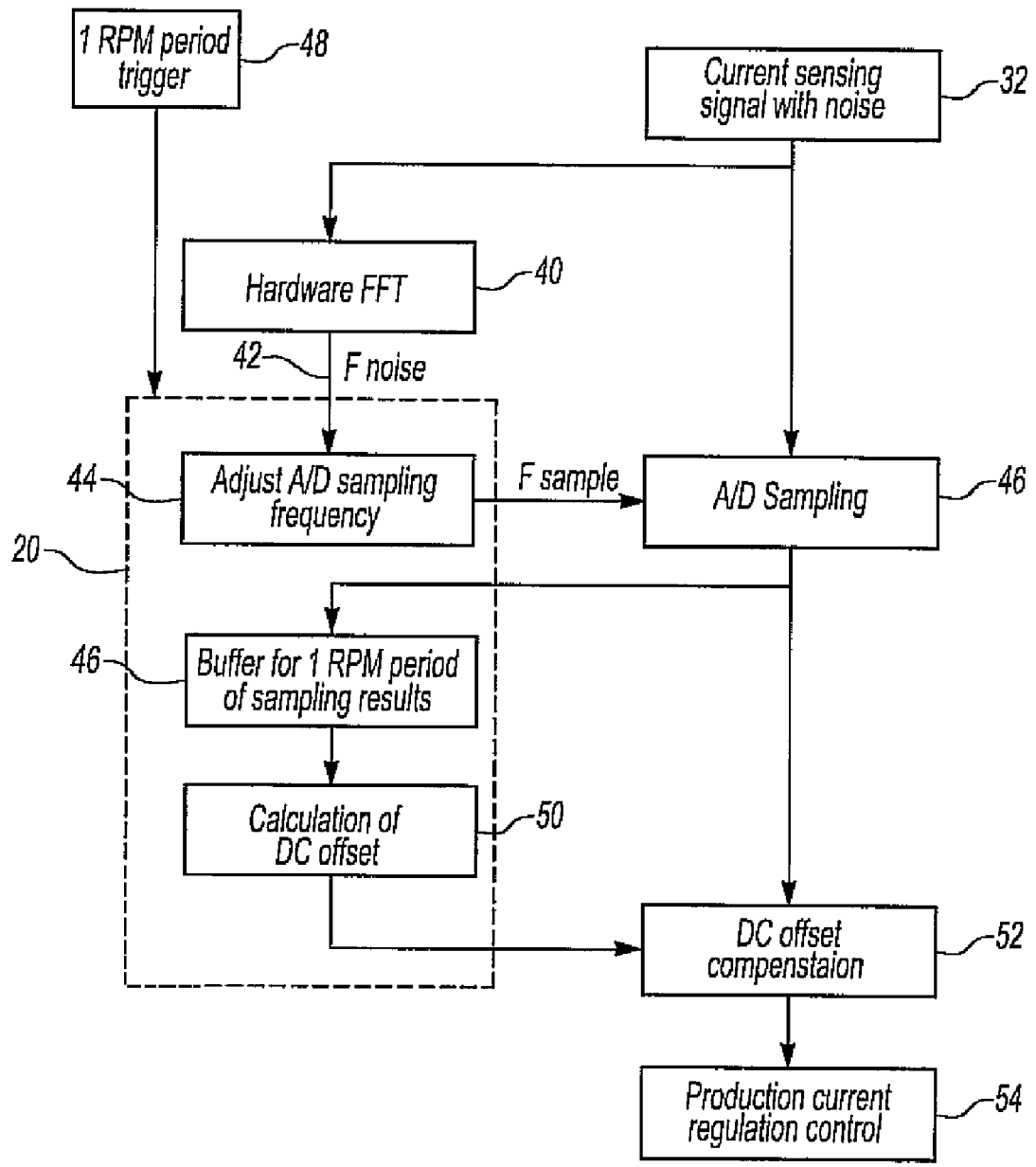
FIG. 3 is a flowchart illustrating the DC compensation of the present invention.

With reference then to FIG. 3, in order to compensate for the DC offset which may result from the sampling of the current output signal from the inverter, the current sensor 32 is coupled through a hardware fast Fourier transform 40 which provides an output signal on its output 42 to the processor 20. The processor 20 is programmed to adjust the analog/digital sampling frequency as indicated at block 44 which obtains a current sample at block 46 at the frequency of the noise. The processor 20 then stores the sample current in a buffer 46 for one full electrical revolution of the AC motor. An RPM trigger signal 48 is provided to the processor 20 to mark the beginning and end of each electrical revolution of the motor/generator 14 for the case of multiple pole pairs of the AC motor.

The processor 20 is further programmed to add all of the current samples together at block 50 for a cycle or rotation of the motor 14. The summation of all of the current samples during one electric revolution of the motor 14 equals the DC offset between the actual current signal 24 (FIG. 2) and the sampled current signal for the composite signal 28. That DC offset is then stored at step 52 and the current DC offset 52 is then utilized by the motor control circuits to achieve accurate control of the motor/generator 14.

It will be understood, of course, that the storage of all of the current signals for each electric revolution of the electric motor 14 and the calculation of the DC offset is continuously updated on an iterative basis. Thus, even though the actual DC offset is accurate for the previous RPM of the motor/generator 14, as a practical matter the acceleration and deceleration of the motor/generator 14 is sufficiently slow so that the actual calculation of the DC offset remains sufficiently accurate despite such acceleration or deceleration.

Although, as described above, the sampling rate is adjusted to the frequency of the dominant noise, if the computational power of the processor allows, the sampling rate may alternatively be set to a multiple of the dominant noise frequency. For example, if the sampling rate is set to twice the frequency of the dominant noise, a sample may be obtained at a middle high as well as a middle low of the combined noise and desired signal of the phase current. By averaging these two values, a more accurate value of the phase current signal may be obtained and which simultaneously reduces the DC offset.

From the foregoing, it can be seen that the present invention provides a power inverter which provides noise compensation for improved current accuracy. Having described our invention, however, many modifications thereto will become apparent to those skilled in the art to which it pertains without deviation from the spirit of the invention as defined by the scope of the appended claims.

We claim:
1. A power inverter comprising:
a gate assembly having an alternating current power output, a processor which controls the operation of the gate assembly, a current sensor having an output signal representative of the current on the power output, a noise detector circuit which receives an input signal from said current sensor and provides an output signal to said processor of the frequency of electromagnetic noise in the power inverter, said processor programmed to sample the current from said current sensor at a multiple of the frequency of said noise.

2. The invention as defined in claim 1 wherein said processor generates a PWM signal to said gate assembly.

3. The invention as defined in claim 1 wherein said processor is programmed to add together each current sample for one complete cycle of the output from said gate assembly to form a sum, said sum representing a direct current offset of the sampled current output from said gate assembly and the actual current output from said gate assembly.

4. The invention as defined in claim 1 wherein said noise sensing circuit comprises a fast Fourier transform circuit.

5. The invention as defined in claim 1 wherein said multiple is one.

6. The invention as defined in claim 1 wherein said multiple is two and wherein said processor is programmed to average each pair successive samples.

7. A method for controlling a power inverter, said inverter having a gate assembly with an alternating current power output, a processor which controls the operation of the gate assembly and a current sensor having an output signal representative of the current on the power output, said method comprising the steps of:

sensing electromagnetic noise in the power inverter, determining the frequency of the sensed electromagnetic noise, sampling the value of the current from said current sensor at a multiple of the frequency of said noise, and said processor generating control signals to said gate assembly as a function of said sampled current values.

8. The invention as defined in claim 7 and comprising the step of summing the sampled current for one complete cycle of the alternating current output to form a direct current offset.

9. The invention as defined in claim 8 and comprising the step of storing said sampled current in a buffer.

10. The invention as defined in claim 7 wherein said processor control signals are pulse width modulated signals.

11. The invention as defined in claim 7 wherein said multiple is one.

12. The invention as defined in claim 7 wherein said multiple is two and comprising the step of averaging each successive pair of sample values.

\* \* \* \* \*